Patented Nov. 11, 1930

1,781,105

UNITED STATES PATENT OFFICE

JAMES SHELBY DOWNARD, OF DALLAS, TEXAS

PREMIXED ASPHALT COMPOSITION AND PROCESS FOR PRODUCING THE SAME

No Drawing.     Application filed March 6, 1926.   Serial No. 92,944.

My invention proposes a new and original process for treating such adhesive mixtures as asphalt coated stone and asphalt coated sand when cooled to a granular form so that they may be maintained in a granular or highly divided condition without adhering or consolidating; but which mixtures may at the will of the operator be changed from non-adhesive mixtures into adhesive mixtures and consolidated either by a slight heat process or cold under pressure, being thus reduced to final and ultimate compaction. The invention also proposes a novel asphalt compound.

Heretofore in this art of paving with asphalt the material has been manufactured at a portable plant and has been laid hot, or has been cooled and granulated and either laid cold or re-heated. After cooling and granulating, such compounds, which may consist of asphalt coated stone, or asphalt coated sand or the like, have been kept in a divided state by reducing the cementitious and adhesive properties of the asphalt cement as by cutting the same with a volatile solvent or by keeping the particles of coated mineral matter divided with some sort of dust and by other expedients.

Such an adhesive mixture is the ordinary sheet asphalt composition of sand and asphalt or stone and asphalt which is in general use and is, under ordinary conditions, laid hot, but which may be cooled to granular form.

A particular and standard mixture known as sheet asphalt is composed of 85% of sand, 10% of asphalt and 5% of dust known as mineral filler. The sand is dried and heated and while hot is mixed with melted asphalt in a mechanical mixture so that each grain of sand is coated or covered with asphalt and the compound could be well described as asphalt coated sand.

The dust or filler is mixed in or incorporated into this mixture in its dry state by mechanical stirring.

This composition may be made granular by plunging it into water after passing it through a sieve and may be laid by re-heating at a distance from the place of manufacture, but if stored will gradually consolidate of its own weight because of the heat of the sun when subjected thereto, or because of pressure of the mass itself in storage. It often becomes set in cars or wagons during transportation so that it cannot be used and is therefore worthless.

The object of my invention is to put such a composition or compositions of like character in such a condition that they may be shipped, stored and used without adhering until it is the will of the operator that they be changed from non-adhesive mixtures to adhesive mixtures, whereupon they may be spread, raked and rolled and consolidated in the form desired by the operator either in sheets or other form.

For the purpose of maintaining these compositions of mineral aggregate and asphalt in a non-adhesive state I make use of the well known property that a film of water has for keeping asphalt surfaces from adhering and the well known property of deliquescent salts for absorbing moisture, even from the air, and thereby forming a liquid similar to water but of greater body and coating quantity and practically non-evaporative.

It is apparent that water will keep the particles separated and that they will not adhere as long as the surfaces are wet but water alone will not perform this service under the conditions met with in actual practice because it drains away and the mass becomes dry or the film becomes so thin that adhesion or consolidation takes place, in hot dry air evaporation soon removes the water from the composition.

A deliquescent salt has great avidity for water and its dry crystals will take water from the air and change it from a dry salt to a liquid, said liquid having a considerable coating capacity. Such a salt is calcium chloride (CaCl₂).

For practical purposes a 35% solution of calcium chloride containing 5.2 lbs. of calcium chloride to a gallon of water is a practical solution for general use.

Such a solution with water will not evaporate, will not drain away or run off the asphalt particles, but will coat them with a thin film which has only slight adhesion.

This solution, therefore, when mixed with cold, granular asphalt such as asphalt coated stone and the like will maintain it in a state of division for the purpose of shipment and application at all normal temperatures.

When it is desired to make the composition adhesive it may be done by treating it with a solution of ammonium oxalate $(NH_4)_2C_2O_4+H_2O)$ which solution will precipitate the mineral out of the calcium chloride producing an insoluble residue, and on heating the water will evaporate and the ammonium chloride in the water will decompose under the heat approximately 360° and pass off as chlorine gas and ammonia gas. On evaporation of 10 mils. of aqueous solution it leaves .004 of fixed residue only, said solution being a saturated solution 1 in 20.

The separating and dividing qualities of the solution of calcium chloride is thereby nullified and the asphalt surfaces are free to adhere under pressure.

The mixture may be agitated cold with the ammonium oxalate and then warmed sufficiently to hasten evaporation. The same result may be obtained by the use of another salt such as sulphate, phosphate, or carbonate of ammonium.

While these salts are pointed out as carrying out the principles of my invention, other chemicals will immediately suggest themselves to the practical chemist which will carry out the same principles under slightly different conditions and costs. It is pointed out that the methods of applying these solutions are many and quite apparent and will suggest themselves to a skilled person, but the most effective is to pass the granular asphalts through a bath of the solution and the solution of the precipitating agent may be sprinkled or flooded over the loose granular mixture after it is placed in situ, in sufficient quantity to cause the proper chemical reaction and change the mixture into an adhesive one by destroying the separating media.

The residue of the operation is an advantage to the composition as this amorphous material is a very fine filling agent and one required in asphalts as filler.

Having thus described my process which may be subjected to various forms and types, such as weakening or strengthening the solution to meet the requirements of the aggregate as to size and condition it is obvious that this process may be used for all sizes of aggregate of stone, sand or slag and all conditions of adhesive mixture, either made from asphaltum or other binders of adhesive nature. The advantage of my invention is obvious as it provides a means for the manufacture of asphalt mixture at a central plant and their shipment for use at distant places in a premixed condition.

I claim:—

1. The process of manufacturing asphalt paving mixtures which comprises covering asphalt-coated grains with a solution of calcium chloride, thus coating the particles and preventing adhesion and subsequently changing the mixture from a non-adhesive state to an adhesive state by treating the calcium chloride film with a precipitating agent which will evaporate and pass off when the mixture is to be applied to the roadbed.

2. The process of manufacturing asphalt paving mixtures which comprises making a granulated mixture of asphalt and sand, cooling the same, treating the cooled mixture with a solution of calcium chloride in order to prevent adhesion of the granulated mixture during storage or transportation, and then changing the mixture to an adhesive mixture by reacting ammonium oxalate with the mixture before the mixture is formed into a roadbed.

3. An asphalt composition in a granular form composed of asphalt, an aggregate of mineral matter and a solution of calcium chloride forming a coating for the granules.

4. A non-adhesive granular asphalt composition adapted to be transported while cold and to be changed to an adhesive solidifying mixture at the will of the operator by the addition of ammonium oxalate and comprising divided mineral matter coated with asphalt and also having the surface of the asphalt coated with a solution of calcium chloride.

5. A step in the process of manufacture of asphalt paving mixture which comprises applying a separating media made from calcium chloride to particles having an asphalt surface for maintaining the particles in a non-adhesive condition.

6. The process of manufacturing asphalt paving mixture which comprises coating asphalt-coated aggregates with a solution of calcium chloride for maintaining the asphalt-coated aggregates wet and separated by a film of the solution, reacting with the calcium chloride a precipitating salt which will render the asphalt-coated aggregates adhesive and capable of being consolidated into a stable and substantially rigid mass.

7. The process of manufacturing asphalt paving mixture which comprises separating soft adhesive asphalt-coated particles by coating the said particles with a calcium chloride solution and then re-acting the calcium chloride solution with ammonium oxalate.

8. The process of manufacturing asphalt paving mixtures which comprises treating a mineral aggregate coated with an asphalt mixture with a division agent such as calcium chloride and subsequently re-acting with the division agent a precipitating agent that will produce with the division agent a substance capable of being evaporated and capable of leaving the original mixture of the mineral aggregate coated with the adhesive mixture in an adhesive state.

JAMES SHELBY DOWNARD.